July 21, 1931. E. A. GUILLEMIN 1,815,710
APPARATUS FOR DETECTING A DIFFERENCE IN THE THICKNESS OF MATERIALS Filed June 29, 1929

Inventor
Ernst A. Guillemin
By N. A. Pattum. Atty.

Patented July 21, 1931

1,815,710

UNITED STATES PATENT OFFICE

ERNST A. GUILLEMIN, OF BROOKLINE, MASSACHUSETTS, ASSIGNOR TO WESTERN ELECTRIC COMPANY, INCORPORATED, OF NEW YORK, N. Y., A CORPORATION OF NEW YORK

APPARATUS FOR DETECTING A DIFFERENCE IN THE THICKNESS OF MATERIALS

Application filed June 29, 1929. Serial No. 374,835.

This invention relates to an apparatus for detecting a difference in the thickness of materials, and more particularly to an apparatus for detecting a difference in the thickness of different portions of a lead or lead alloy sheath covering a cable.

In the sheathing of telephone cable with a lead or lead alloy covering, the cable passes longitudinally through a heated die associated with an extrusion press which extrudes the lead or alloy onto the cable, and in order that the metal will be extruded in equal amounts on all sides of the cable to produce a sheath of the same thickness throughout its circumference, it is necessary that the different portions of the die be heated at the proper temperatures. For the purpose of controlling these temperatures it is desirable that some means be provided for detecting variations in thickness in the different portions of the sheath.

An object of this invention is to provide a sensitive and efficient apparatus for detecting a difference in the thickness of different portions of a material.

In accordance with this object one embodiment of the invention consists of a pair of detector coils which are mounted on opposite sides of a lead sheathed cable close to where the cable emerges from the lead extruding apparatus, the coils having adjustable laminated cores which are resiliently supported within guides so that the core laminations may slide over each other to make direct intimate contact with the contour of the lead sheath. The coils are connected into a Wheatstone bridge and galvanometer circuit for indicating an unbalance in the coils and thus a variation in the thickness of the detected portions of the sheath, and by controlling the sheath production according to this indication a uniform and even sheath may be secured.

Figure 1:
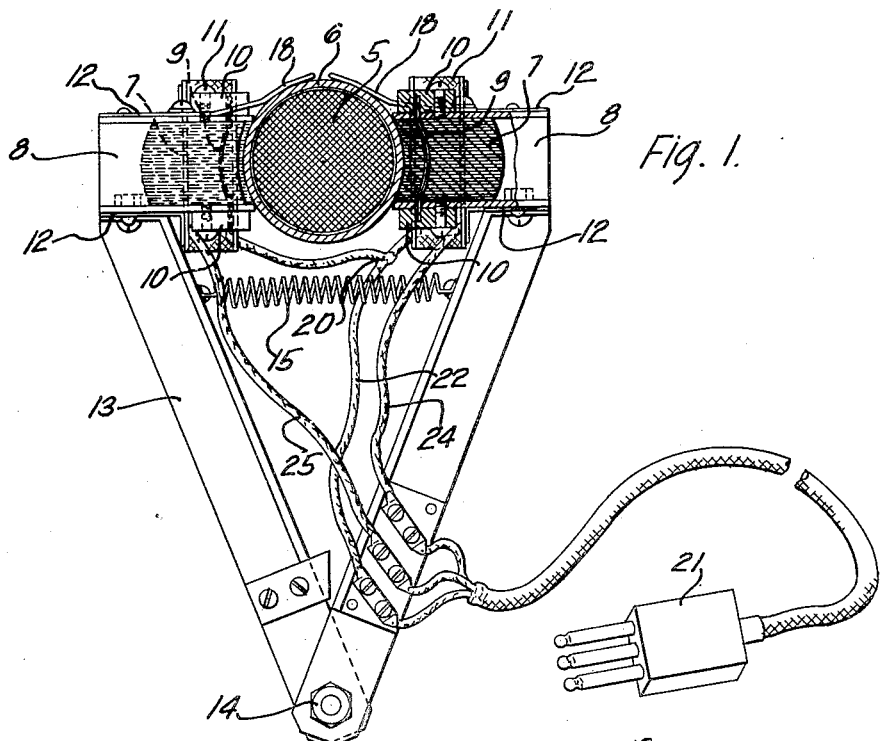
Figure 2:
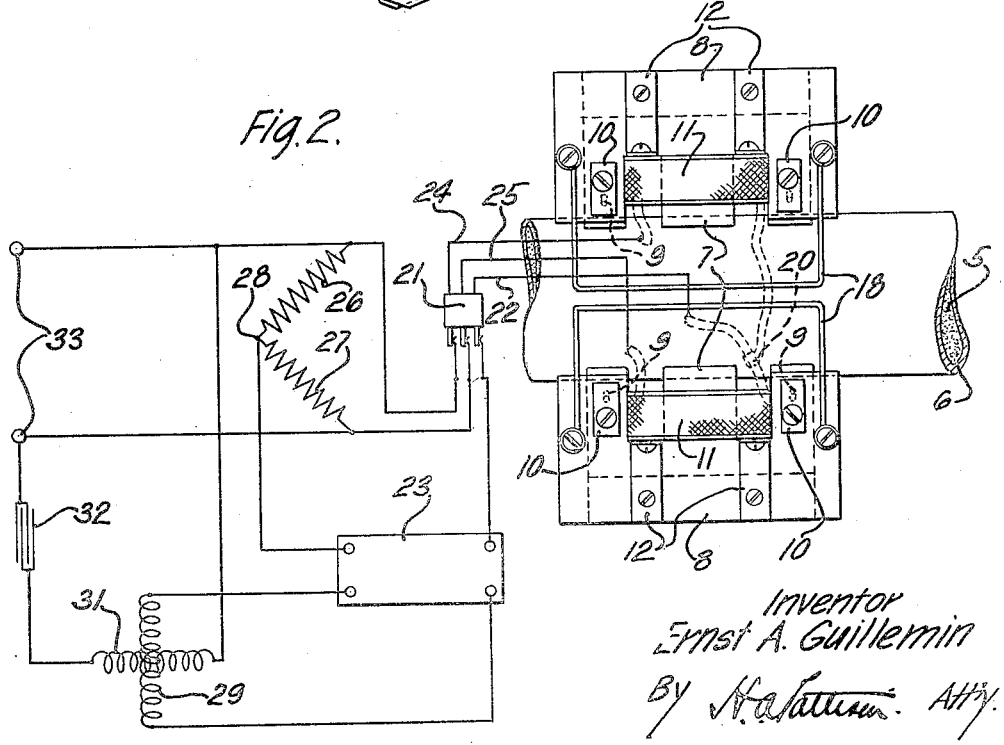

A clear understanding of the invention will be had from the following description of one embodiment thereof when taken in connection with the accompanying drawings, wherein Fig. 1 is an end view of the detector coils and cores and their mountings, partly shown in section; and Fig. 2 is a plan view of the coils and connections to a Wheatstone bridge circuit.

Referring now to the drawings in which like numerals designate similar parts in the two views, there is disclosed a portion of a telephone cable 5 having a sheath 6 the variation in thickness of which sheath it is desired to detect by means of this invention. On opposite sides of the sheath and in intimate contact therewith are mounted a plurality of E-shaped laminations 7 (see Fig. 2) grouped within rectangular guides 8 and resiliently supported therein by means of transverse springs or wires 9 extending through apertures in the ends of the laminations and terminating in the posts 10 which are secured to the sides of the guides. The E-shaped laminations 7 extend lengthwise of the cable sheath 6 and are slidable over each other, and by means of the transverse springs 9 each lamination is resiliently forced into edgewise engagement with the sheath even if its contour should be irregular due to the handling of the cable.

A pair of similar induction or detector coils 11 wound upon suitable spools and disposed flatwise to the cable 5 are supported within the depressions of the E-shaped laminations by brackets 12 secured to the outer surfaces of the guides 8, but do not abut against the bottoms of the depressions of the laminations in order to allow the laminations to slidably adjust themselves to the sheath contour as mentioned above. Thus it will be understood that the laminations are adjustable cores for the detector coils 11 and operate as paths for the flux into and away from the sheath and due to their relative adjustability prevent any air gaps existing between them and the sheath. The guides 8 supporting these coils and laminations are maintained in their positions opposite the cable by means of an A frame 13 having its outer ends bolted to the guides, being hinged at 14 and provided with a transverse spring 15 for clamping the laminations to the sheath. Wire supports 18 of U-shape are secured to the upper sides of the guides 8 for suspending the coils and laminations from the cable.

The detector coils 11 are electrically connected in series at 20 (Fig. 2) and to a Wheatstone bridge and galvanometer circuit through a three conductor plug 21 which connects a common lead 22 of the coils with an input terminal of a usual type of amplifier 23 and the other two leads 24 and 25 thereof with the terminals of similar fixed Wheatstone bridge arms 26 and 27. The common point 28 of the bridge arms 26 and 27 is connected to the other input terminal of the amplifier 23, and thus the amplifier 23 is connected diagonally across a complete Wheatstone bridge composed of the fixed arms 26 and 27 and variable arms consisting of the detector coils 11. The output side of the amplifier 23 is connected to the movable coil 29 of a galvanometer movable in either direction and the stationary coil 31 of this galvanometer is connected to a condenser 32 to correct its power factor and to the terminals 33 of a suitable oscillating current supply which also supplies the Wheatstone bridge.

In the operation of the above described detecting apparatus the cable 5 passes away from the lead sheath extruding structure and between the oppositely clamped laminated cores 7 which are secured in a stationary position by suitable means (not shown) securing the guides 8 to the extruding structure. As long as the sheath thickness is uniform or the same on both sides of the cable, the detector coils 11 will remain electrically balanced and the movable coil 29 will be in its normal position, but when either side of the sheath becomes thicker than the other side the coils and the bridge will become unbalanced and the coil 29 will swing to the right or to the left to indicate which side of the sheath is thicker and the amount of such excess, whereupon the heat applied to the different portions of the die of the lead extruding structure may be regulated to correct this unevenness. Obviously, this movement of the coil 29 may be used to automatically control the extrusion process by connection with suitable apparatus. Furthermore, it is apparent that similar coils may be used for controlling the thickness of the upper and lower portions of the sheath. It will be noted that because of the fact that the core laminations 7 are adjustably forced against the sheath 6 by means of the transverse springs 9 an intimate contact excluding air gaps between the coil cores and the sheath is insured although the sheath may be irregularly bent in handling, which adjustable feature provides for sensitive and accurate results. In order to secure this intimate contact the coils themselves might be placed in engagement with the sheath, but as the sheath is heated at a high temperature such construction would not be feasible because of burning the insulation from the coils.

Thus it is believed to be apparent from the above description that the apparatus herein disclosed accurately and efficiently detect variations in thickness of a metallic tube and although only one specific structure has herein been described, it is of course to be understood that the invention is not to be limited thereto, but is to be limited only by the scope of the appended claims.

What is claimed is:

1. In an apparatus for detecting a difference in the thickness of different portions of a metallic tube, electrical detecting means placed in direct contact with the different portions and conformable to the contour thereof, and means for electrically balancing the detecting means with each other to indicate the difference in thickness.

2. In an apparatus for detecting a difference in the thickness of different portions of a metallic tube, induction coils positioned adjacent the different portions, adjustable cores for the induction coils conformable to the contour of the different portions for direct intimate contact therewith, and means for electrically balancing the cores with each other to indicate the difference in thickness of the different portions.

3. In an apparatus for detecting a difference in the thickness of different portions of a metallic tube, induction coils positioned adjacent the different portions, laminated cores for the induction coils adjustable to the contour of the different portions, means for resiliently sliding the various laminations of the cores into intimate contact with the different portions, and a Wheatstone bridge and galvanometer circuit for electrically balancing the coils with each other to indicate the difference in thickness.

4. In an electromagnetic device, a coil, a laminated core therefor, and resilient means for adjusting the laminations of the core.

5. In an electromagnetic device, a coil, a laminated core therefor, and resilient means traversing the laminations of the core for adjusting them to a predetermined position.

6. In an electromagnetic device, a coil, a laminated core therefor, a guide for grouping the laminations of the core, and resilient members secured transversely to the guide and threaded through apertures in the laminations for supporting the laminations in an adjustable position.

7. In an electrical detecting device, a detecting coil having a central aperture, a rectangular guide box inserted in the central aperture, metallic laminations with their respective flat surfaces engaging each other positioned in the guide box for transverse movement through the coil and having registering apertures extending cross-wise thereof, and leaf springs inserted through the lamination apertures and secured to the guide box for adjustably supporting the laminations therein in accordance with the surface outline of the material engaged by the edges of the movable laminations in the detecting process.

8. In an electrical detecting device, a pair of opposed detecting coils, metallic laminations resiliently slidable edgewise through the center thereof for conformably engaging the surface of the material to be detected, and an A-shaped frame whose outer ends support the respective detecting coils and are pulled towards each other by a spring to cause the laminations to encompass the material.

In witness whereof, I hereunto subscribe my name this 17th day of June, A. D., 1929.

ERNST A. GUILLEMIN.